US005368541A

United States Patent [19]

Knelson

[11] Patent Number: 5,368,541

[45] Date of Patent: Nov. 29, 1994

[54] METHOD OF EXTRACTION OF MERCURY AND GOLD FROM MINE TAILINGS

[76] Inventor: Benjamin V. Knelson, 20321-86th Avenue, R.R. #11, Langley, British Columbia, Canada, V3A 6Y3

[21] Appl. No.: 70,527

[22] Filed: Jun. 3, 1993

[51] Int. Cl.[5] ........................ B01D 43/00; B04B 11/00

[52] U.S. Cl. ........................................ 494/37; 494/29; 494/56; 494/63; 494/80; 494/902

[58] Field of Search .................................. 494/27-29, 494/36, 37, 44, 56, 63, 65, 67, 80, 902; 210/380.1, 781; 209/303, 727, 730

[56] References Cited

U.S. PATENT DOCUMENTS

| | | | |
|---|---|---|---|
| 957,478 | 5/1910 | Simpson . | |
| 1,071,870 | 9/1913 | Boss | 494/56 X |
| 1,190,466 | 7/1916 | Schifferle . | |
| 1,473,421 | 11/1923 | Eccleston . | |
| 1,530,758 | 3/1925 | Coleman | 494/44 |
| 1,557,671 | 10/1925 | Doerner . | |
| 1,594,501 | 8/1926 | Eccleston . | |
| 1,684,870 | 9/1928 | Lewis | 494/902 X |
| 2,723,799 | 11/1955 | Sharples . | |
| 3,732,979 | 5/1973 | Gilkey | 494/902 X |
| 4,265,743 | 5/1981 | Younge | 494/37 X |
| 4,608,040 | 8/1986 | Knelson . | |
| 4,776,833 | 11/1988 | Knelson . | |
| 4,846,781 | 7/1989 | Knelson . | |
| 4,966,576 | 10/1990 | Schulz et al. . | |
| 4,981,219 | 1/1991 | Burnell et al. | 494/67 X |

FOREIGN PATENT DOCUMENTS

| | | | |
|---|---|---|---|
| 22055/35 | 4/1935 | Australia | 494/27 |
| 393447 | 6/1933 | United Kingdom | 494/56 |

*Primary Examiner*—David A. Scherbel
*Assistant Examiner*—Charles Cooley
*Attorney, Agent, or Firm*—Adrian D. Battison; Murray E. Thrift; Stanley G. Ade

[57] ABSTRACT

A method of separately extracting mercury and gold from mine tailings includes a centrifugal separator comprising a centrifuge bowl having a plurality of annular rings on the peripheral surface. An outer bowl or sleeve member provides a jacket from which water is injected through holes in the inner bowl into recesses between the annular rings. Feed materials containing gold and mercury are separated so that the gold and mercury is collected with the heavies in the recesses. The liquid mercury escapes through the holes in the inner bowl onto the inner surface of the outer bowl which is provided with an annular receptacle and is shaped to collect the mercury at the receptacle axially spaced from the open mouth of the bowl. A plurality of outlets in the annular receptacle allow the escape of the mercury into a secondary launder inside the outer launder for the main discharge materials from the open mouth. The liquid mercury is thus collected separately from the solid heavies within the bowl and separately from the discharged light material.

8 Claims, 3 Drawing Sheets

METHOD OF EXTRACTION OF MERCURY AND GOLD FROM MINE TAILINGS

BACKGROUND OF THE INVENTION

This invention relates to a method and apparatus for extraction of mercury and gold from mine tailings.

In recent years effective centrifugal separating devices have become available for more effective separation of heavy materials including gold from particulate mineral feed. The feed is graded to a required particulate size for feeding into the centrifuge bowl and is mixed with water to form a flowing slurry which can pass into the bowl for reaction of high centrifugal force to cause effective and efficient separation. One machine of this type is manufactured by a company associated with the present inventor and in one embodiment of that machine is shown in detail in U.S. Pat. No. 4,846,781 issued Jul. 11, 1989. Further details of the same machine are shown in U.S. Pat. No. 4,776,833 issued Oct. 11, 1988 and U.S. Pat. No. 4,608,040 issued Aug. 26, 1986. Reference to the detail shown in these patents should be made by the reader for any points omitted herein or requiring further explanation.

One particular field of use for the above machine is that of retreatment of mine tailings to extract gold which has previously remained in the tailings or rejected materials due to the inefficiency of the process used at the time of separation.

In addition to the gold present in the tailings there is also in many cases a significant quantity of mercury which has been released into the environment from the processes used at the time of the original mining procedure. This mercury is of course a significant contaminant to the environment and is highly desirable to clean up or extract the mercury at the same time as extracting the valuable gold content.

The above machine of the present inventor is highly effective in separating the gold content. However it has been found that it does not effectively extract and collect the mercury content and this is rereleased into the mine tailings. The machine thus extracts the valuable content but cannot at the same time effect the desirable environmental clean up. As the mercury is in liquid form it tends to escape from the bowl and reenter the tailings.

A number of previous machines have been proposed for continuous separation of a heavier component from a light component and examples of these are shown in U.S. Pat. No. 1,473,421 (Eccleston); U.S. Pat. No. 1,283,846 (Mark et al); U.S. Pat. No. 1,557,672 (Doerner); U.S. Pat. No. 3,192,149 (Keith); U.S. Pat. No. 4,966,576 (Schultz et al); U.S. Pat. No. 1,190,466 (Schifferie); U.S. Pat. No. 2,723,799 (Sharples); 957478 (Simpson) and U.S. Pat. No. 1,594,501 (Eccleston). However none of these patents relate to the separation of the heavies including gold in solid form and the separate extraction of mercury in liquid form, all separate from the light materials which are discarded.

SUMMARY OF THE INVENTION

According to the first aspect of the invention there is provided an apparatus for centrifugally separating intermixed materials of different specific gravities comprising a centrifuge bowl having a base and a peripheral wall surrounding an axis passing through the base and generally upstanding from the base to an open mouth, a plurality of axially spaced inwardly projecting peripherally extending ring members defined on an inner surface of the peripheral wall so as to provide a peripherally extending recess between each ring member and the next adjacent ring member, and a plurality of openings extending through the peripheral wall from an outer surface to the inner surface thereof, the openings being arranged in the recess between each member and the next adjacent member and in spaced relation around the peripheral wall, means mounting the bowl for rotation about the axis, means for feeding materials into the bowl such that during rotation of the bowl they flow over the peripheral wall for discharge from the open mouth, first collection means for collecting materials exiting from the open mouth, an outer bowl member surrounding the outer surface of the bowl, means for supplying fluid under pressure between the outer surface of the bowl and the outer bowl member so as to pass through the openings and fluidize the materials in the recesses, said outer bowl member comprising a wall having an inner surface shaped to converge materials contacting the inner surface to an axial location thereon axially spaced from the open mouth, outlet opening means at said axial location for escape of materials therefrom and second collection means for collecting said materials from said outlet opening means separately from said first collection means.

According to a second aspect of the invention there is provided a method of separating from feed materials containing water, gold, mercury and mineral tailings a first component including gold and a second component including mercury comprising feeding the feed materials into a centrifuge bowl having a peripheral wall surrounding a rotation axis of the bowl and an open mouth at one axial end of the bowl, rotating the bowl about the axis, causing the feed materials to flow over the peripheral wall to the open mouth, defining a shape of the peripheral wall such that heavier materials including mercury and gold collect on the peripheral wall while lighter materials including the mineral tailings and water escape through the open mouth, providing a plurality of holes through the peripheral wall, causing mercury to pass through the holes while solid materials including gold remain on the peripheral wall, collecting separately from the lighter materials the mercury which passes through the holes and intermittently extracting the heavier materials including gold from the peripheral wall.

One embodiment of the invention will now be described in conjunction with the accompanying drawings in which:

DESCRIPTION OF THE DRAWINGS

In the drawings like characters of reference indicate corresponding parts in the different figures.

DETAILED DESCRIPTION

Figure 1:
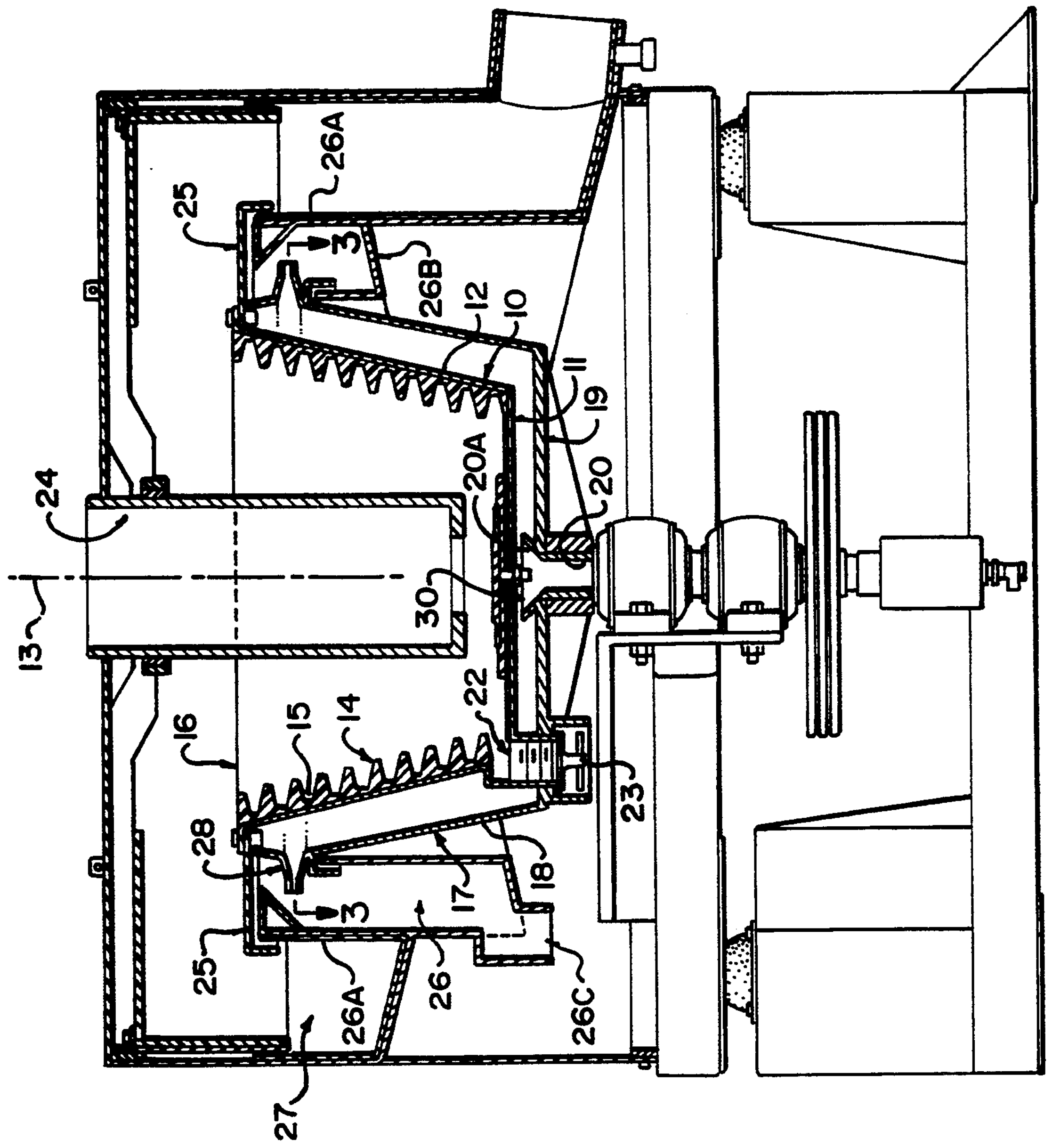
FIG. 1 is a vertical cross sectional view through a centrifugal separator according to the present invention.
Figure 2:
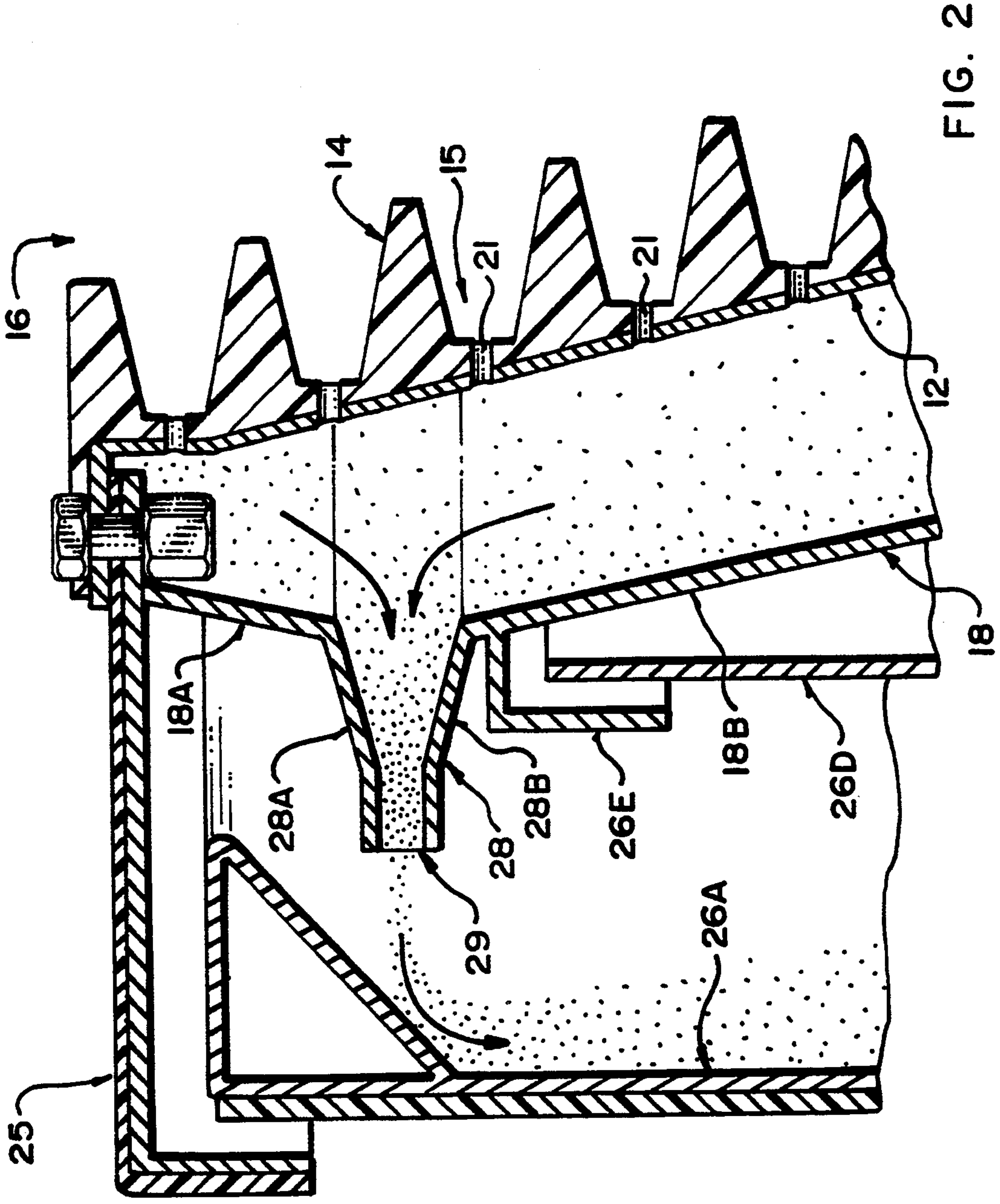
FIG. 2 is a cross-sectional view of one part only of the apparatus of FIG. 1 on an enlarged scale.

The general construction of the centrifuge apparatus is shown in the above mentioned prior patents of the present inventor and the following brief description of the general construction is included for completeness only.

The apparatus comprises generally a centrifuge bowl 10 having a base 11 and a peripheral wall 12 surrounding a longitudinal axis 13 about which the bowl rotates. The bowl peripheral wall 12 has on its inside surface a molded liner 14 defining a plurality of annular rings at axially spaced positions along the peripheral wall. Between each ring and the next adjacent ring is defined a recess 15 into which heavier materials collect. At an upper end of the bowl opposite to the base 11 is provided an open mouth 16 through which lighter materials can escape.

The bowl 10 further includes an outer bowl portion 17 including an outer bowl sleeve 18 and an outer bowl base 19. Between the sleeve 18 and the peripheral wall 12 is defined a generally cylindrical space into which water can be fed from a feed duct 20 entering into the space between the outer bowl base 19 and the base of the bowl 11, the duct also acting as a support shaft for the bowl. The peripheral wall has a plurality of holes 21 extending therethrough to communicate between the cylindrical space and the interior of the bowl so that water pumped through the duct 20 passes through the holes 21 to fluidize the material in the recesses 15.

The bowl includes an outlet duct 22 in the base 11 adjacent one edge of the base and extending from the base 11 through the outer bowl to an outlet closure 23 which can be opened to release the materials from inside the bowl on an intermittent basis.

A feed duct 24 extends into the bowl to a position adjacent the base 11 for discharging feed materials into the bowl to flow outwardly from the base and to pass over the peripheral wall. At the open mouth of the bowl is provided a flange member 25 which is annular and lies in a radial plane of the axis 13. The flange member 25 is bolted to an upper annular portion of the outer bowl so as to connect the inner bowl and outer bowl for co-rotation. The flange 25 extends over a first annular channel 26 into a second annular channel 27 which acts to collect the materials escaping from the open mouth of the bowl and acts thus as a first launder for the centrifuge bowl.

Figure 3:
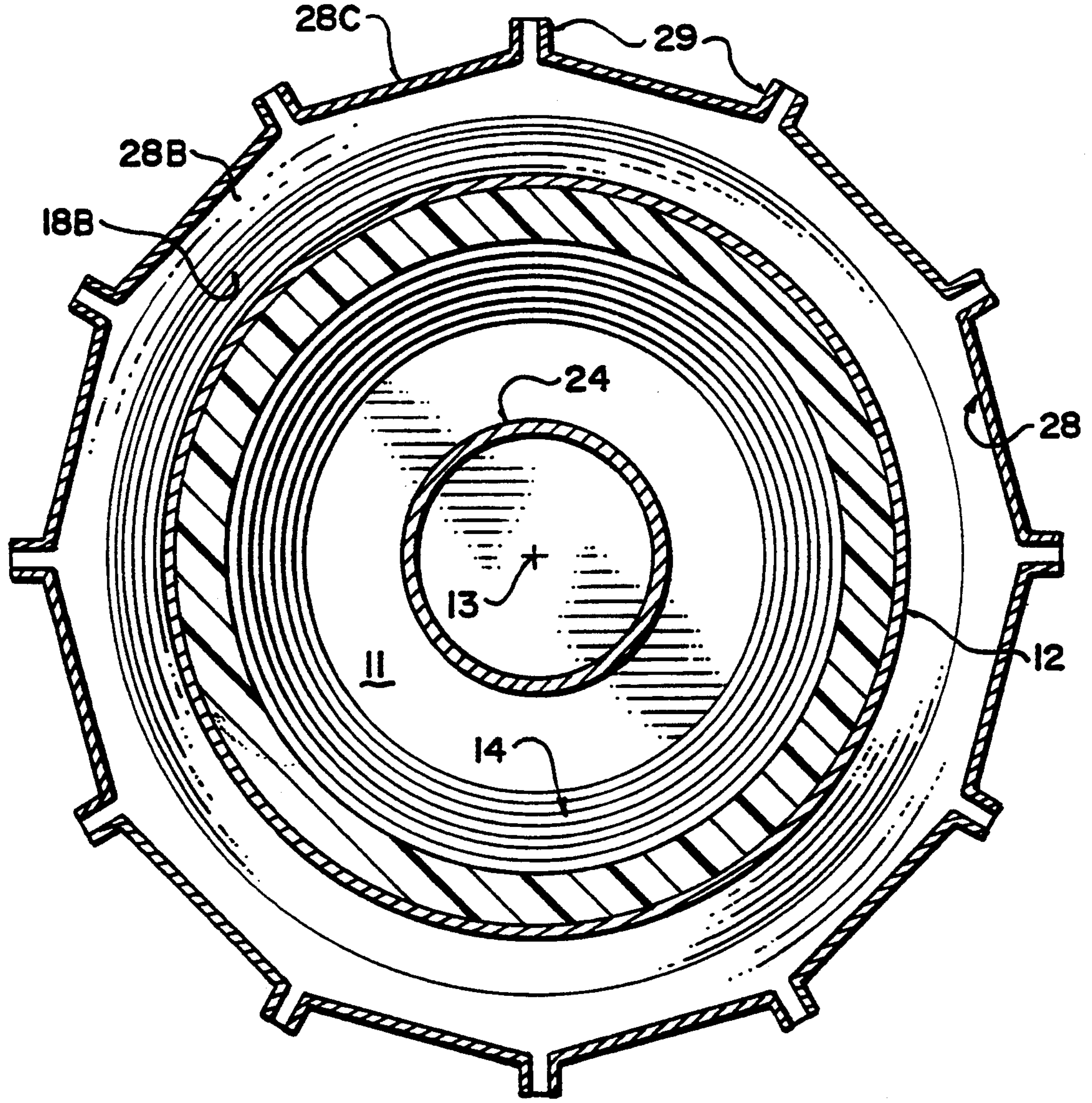
FIG. 3 is a cross-sectional view along the lines 3—3 of FIG. 1.

The sleeve 18 includes an upper sleeve portion 18A and a lower sleeve portion 18B which are shaped so that they converge radially outwardly to an annular receptacle 28 lying at a particular radial plane of the bowl. The annular receptacle 28 thus includes an upper wall 28A connected to a bottom edge of the wall 18A together with a bottom wall 28B connected to a top edge of the wall 18B of the outer bowl. The wall 28A and 28B converge to an apex spaced outwardly of the walls 18A and 18B so that material within the outer bowl is centrifuged to follow the outwardly extending wall portions 18A and 18B into the annular receptacle for collection therein. The apex or junction between the walls 28A and 28B forms a ring surrounding the outer bowl indicated at 28C which is polygonal in plan view as shown by looking along the axis 13 in FIG. 3. At each apex of the polygonal shape is provided an outlet nozzle 29 from which the heavier materials collecting in the receptacle 28 can escape radially outwardly into the annular channel 26 forming a second launder. The annular channel 26 is separated from the channel 27 by an outer launder wall 26A which also forms an inner wall of the launder 27. The launder 26 also includes a base wall 26B which is inclined downwardly from the right hand side of the machine as shown in FIG. 1 to an outlet duct 26C providing an outlet from the machine for materials collected in the launder 26.

An inner wall of the launder 26 is indicated at 26D and a flange portion 26E carried by the bowl directs the materials from the nozzle 29 over the inner wall 26D into the launder for collection at the outlet 26C.

In operation feed materials are deposited into the bowl through the duct 24. The feed materials comprise mine tailings which include basic minerals from which gold and mercury are to be separated. The materials are supplied in a slurry form containing water which is discharged into the base of the bowl to pass over the peripheral wall of the bowl to the open mouth.

As explained in the above previous patents, separation of the heavy materials from the lighter materials is effected by the annular rings and by the fluidization caused by the injection of water from the space between the outer bowl and the inner bowl into the recesses 15. This separation causes the heavier materials including the gold and mercury to collect between the rings within the recesses while the remaining materials including the water and discharged minerals escapes from the open mouth through the launder 27 for collection.

The fact that the mercury is in liquid form allows it collect as a liquid material at the base of the recess. This collection of liquid tends to move through the openings 21 into the space between the inner and outer bowls. This outward movement of the solid material including the gold is prevented by the shape and arrangement of the holes 21 which are of the shape and arrangement as shown in the previous patents of the present inventor. The liquid mercury however moves through the openings 21 and collects on the inner surface of the outer bowl. The shape of the outer bowl including the wall portions 18A and 18B directs the mercury by centrifuge action into the receptacle 28. The mercury is thus collected in the receptacle at a position axially spaced from the open mouth so that the mercury and some water escapes through the nozzles 29 as collected in the launder 26. Thus the mercury is collected separately from the heavy solid materials collected within the recesses of the bowl and collected separately from the discharged lighter materials and water. The mercury can thus be recovered and extracted from the tailings to provide environmental clean up. Some gold will be present in the mercury collection outlet 26C but a majority of the gold remains within the bowl for intermittent or batch cleanup as previously described.

In order to prevent mercury from running back into the mouth 20A of the inlet duct 20 at the base of the outer bowl, there is provided an inverted frusto conical shaped baffle member 30 which is attached to the base 19 surrounding the mouth 20A and stands upwardly therefrom. Thus any mercury remaining in the outer bowl when the bowl is halted for the intermittent discharge of the solid materials which runs back to the base 19 is prevented from returning into the duct 20 with a potential of escaping again to the environment.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of separating from mixed feed materials containing water, gold, mercury and mineral tailings a first heavier solid component including gold and a second heavier liquid component including mercury comprising feeding the mixed feed materials into a centrifuge bowl having a peripheral wall surrounding a rotation axis of the bowl and an open mouth at one axial end of the bowl, rotating the bowl about the axis, causing the mixed feed materials to flow over the peripheral wall toward the open mouth, defining a shape of the peripheral wall such that said first and second components including mercury and gold collect on the peripheral wall while lighter materials including the mineral tailings and water escape through the open mouth, providing a plurality of holes through the peripheral wall, causing said second liquid component including mercury to pass through the holes and to be released from the peripheral wall so as to be discharged from the bowl while said first solid component including gold is retained inwardly of the holes on the peripheral wall, collecting separately from the lighter materials said second liquid component including mercury which passes through the holes and is discharged from the bowl and intermittently extracting said first solid component including gold from the peripheral wall separately from said second liquid component including mercury and separately from said lighter materials including the mineral tailings and water.

2. The method according to claim 1 wherein the step of causing said second liquid component including mercury to pass through the holes while said first solid component including gold is retained inwardly of the holes on the peripheral wall includes injecting water through the holes inwardly into the bowl to fluidize said mixed feed materials on the peripheral wall.

3. The method according to claim 1 wherein the step of defining a shape of the peripheral wall includes providing a plurality of axially spaced inwardly projecting peripherally extending ring members on an inner surface of the peripheral wall.

4. The method according to claim 1 including providing said holes at a plurality of axially spaced positions in the peripheral wall of the bowl and wherein the step of collecting said second liquid component including mercury includes providing a sleeve member surrounding the peripheral wall, the sleeve member being shaped to converge said second liquid component including mercury from said axially spaced positions to a single axial location axially spaced from the open mouth.

5. The method according to claim 4 including shaping the sleeve member to define an annular ring having an inner surface projecting radially outwardly from adjacent portions of the inner surface of the sleeve member and causing said second component including mercury to collect in the annular ring.

6. The method according to claim 5 including providing a plurality of outlet openings in the annular ring arranged such that said second component including mercury escaping from the outlet openings escapes substantially radially from the sleeve member.

7. The method according to claim 6 including shaping the annular ring so as to be, in cross-section at right angles to the axis, of polygonal shape having a plurality of apexes, each of said outlet openings being arranged at a respective one of said apexes.

8. The method according to claim 1 including providing a base connected to the peripheral wall at the other axial end of the bowl and including providing a sleeve member surrounding the bowl for injecting a fluid through the holes into the bowl, providing on the sleeve member a base at an end of the sleeve member adjacent the base of the bowl, providing on the base of sleeve member an inlet duct communicating through the base of the sleeve member for injection into the sleeve member of said fluid, and preventing said second liquid component from the interior of the sleeve member, with the bowl stationary, from running back into the inlet duct by providing a baffle on the base of the sleeve member surrounding the inlet duct.

* * * * *